(12) United States Patent
Wan et al.

(10) Patent No.: US 9,693,296 B2
(45) Date of Patent: Jun. 27, 2017

(54) NETWORK CONNECTION METHOD AND APPARATUS

(71) Applicant: Xiaomi Inc., Beijing (CN)

(72) Inventors: Yuzhen Wan, Beijing (CN); Tao Peng, Beijing (CN); Wei Han, Beijing (CN)

(73) Assignee: Xiaomi Inc., Beijing (CN)

( * ) Notice: Subject to any disclaimer, the term of this patent is extended or adjusted under 35 U.S.C. 154(b) by 175 days.

(21) Appl. No.: 14/638,419

(22) Filed: Mar. 4, 2015

(65) Prior Publication Data

US 2016/0021610 A1    Jan. 21, 2016

Related U.S. Application Data

(63) Continuation of application No. PCT/CN2014/091427, filed on Nov. 18, 2014.

(30) Foreign Application Priority Data

Jul. 17, 2014   (CN) .......................... 2014 1 0341364

(51) Int. Cl.
*H04B 7/00*     (2006.01)
*H04W 48/20*    (2009.01)
(Continued)

(52) U.S. Cl.
CPC ......... *H04W 48/20* (2013.01); *H04L 63/0876* (2013.01); *H04W 12/06* (2013.01);
(Continued)

(58) Field of Classification Search
CPC .... H04W 72/02; H04W 76/021; H04W 88/18
(Continued)

(56) References Cited

U.S. PATENT DOCUMENTS 7,260,638 B2 *   8/2007   Crosbie ................... H04L 63/10
                                                          707/999.009
7,502,620 B2 *   3/2009   Morgan ............ H04L 29/12009
                                                          370/328

(Continued)

FOREIGN PATENT DOCUMENTS

CN       101662771 A      3/2010
CN       102204307 A      9/2011

(Continued)

OTHER PUBLICATIONS

International Search Report to PCT International Application No. PCT/CN2014/091427, dated Apr. 20, 2015, (4p).

*Primary Examiner* — Dmitry H Levitan
(74) *Attorney, Agent, or Firm* — Quarles & Brady LLP

(57) ABSTRACT

The present disclosure describes a network connection apparatus and establishment of a network connection for a terminal. A network connection apparatus may select a wireless access point and generate terminal information of a terminal that is seeking network access via the wireless access point. The terminal information may include a terminal identifier and a terminal media access control (MAC) address of the terminal. The network connection apparatus may send the terminal information to the selected wireless access point, which in turn may forward the terminal information to a network provision server. The network provision server may store the terminal identifier and add the terminal MAC address into a network access white list of the selected wireless access point. The selected wireless access point may enable a network connection for the terminal in response to the terminal MAC address being in the network access white list.

17 Claims, 5 Drawing Sheets

(51) Int. Cl.
   *H04L 29/06* (2006.01)
   *H04W 12/06* (2009.01)
   *H04W 48/16* (2009.01)
   *H04W 84/12* (2009.01)
   *H04W 8/20* (2009.01)
   *H04W 12/08* (2009.01)

(52) U.S. Cl.
   CPC .............. *H04W 8/20* (2013.01); *H04W 12/08* (2013.01); *H04W 48/16* (2013.01); *H04W 84/12* (2013.01)

(58) Field of Classification Search
   USPC .................................. 370/310, 328, 329, 230
   See application file for complete search history.

(56) References Cited

U.S. PATENT DOCUMENTS

| | | | | |
|---|---|---|---|---|
| 8,503,358 | B2* | 8/2013 | Hanson | H04L 63/0853 370/328 |
| 8,613,055 | B1* | 12/2013 | Tomilson | G06F 21/00 713/182 |
| 8,768,356 | B2* | 7/2014 | Faulkner | H04W 48/20 455/436 |
| 9,100,381 | B2* | 8/2015 | Cai | H04L 12/14 |
| 9,135,293 | B1* | 9/2015 | Kienzle | G06F 17/30424 |
| 2016/0212150 | A1* | 7/2016 | Thubert | H04L 63/126 |

FOREIGN PATENT DOCUMENTS

| | | |
|---|---|---|
| CN | 102209324 A | 10/2011 |
| CN | 102497638 A | 6/2012 |
| CN | 102821439 A | 12/2012 |
| CN | 103118327 A | 5/2013 |
| CN | 103533608 A | 1/2014 |
| CN | 103648181 A | 3/2014 |
| CN | 103716795 A | 4/2014 |
| CN | 103873454 A | 6/2014 |
| CN | 103874168 A | 6/2014 |
| JP | 2013115613 A | 6/2013 |
| WO | WO2008/140325 A2 | 11/2008 |

* cited by examiner

NETWORK CONNECTION METHOD AND APPARATUS

CROSS REFERENCE TO RELATED APPLICATIONS

This application is a continuation of International Application No. PCT/CN2014/091427 with an international filing date of Nov. 18, 2014, which is based upon and claims priority to Chinese Patent Application No. 201410341364.6, filed on Jul. 17, 2014, the entire contents of which are incorporated herein by reference.

TECHNICAL FIELD

The present disclosure relates to the field of network technologies, and more particularly, to a network connection method and a network connection apparatus.

BACKGROUND

Business entities, such as shops may provide wireless fidelity (WiFi) network access services to a visitor, sometimes for free. For example, when a visitor enters the shop, the visitor's terminal may search out a wireless access point of the WiFi network, and may access the WiFi network via the wireless access point.

Providing a network connection may include steps such as the following. The terminal may search for the wireless access point of the WiFi network. The terminal may send a Hypertext Transfer Protocol (HTTP) request to a network provision server via the wireless access point. The terminal may receive an identity authentication page from the network provision server via the wireless access point. The visitor, that is a user of the terminal, may input a mobile phone number into the identity authentication page and send the page to the network provision server. The terminal may, in response, receive a verification code. The visitor may also input verification information into the identity authentication page and send the page to the network provision server. A media access control (MAC) address sent by the terminal may be added into a network access white list (a list of terminals which are allowed to access the network) in the wireless access point when the network provision server verifies that the verification information is the same as the verification code. In a next access to the WiFi network by the terminal, the wireless access point may allow the network access behavior of the terminal according to the network access white list, and track the network access behavior of the terminal according to the mobile phone number.

SUMMARY

According to a first aspect of embodiments of the present disclosure, a network connection method is provided. The method may include searching for and selecting a wireless access point. The wireless access point may be selected based on predetermined parameters.

The method may further include reading and/or compiling terminal information of a terminal. The terminal information may be compiled after the wireless access point is selected. The terminal information may include a terminal identifier and a terminal MAC address of the terminal.

The method may further include sending the terminal information to the selected wireless access point. The wireless access point may forward the terminal information to a network provision server. In response, the network provision server may store the terminal identifier and add the terminal MAC address into a network access white list of the wireless access point. The terminal MAC address in the network access white list may be used for instructing the wireless access point to allow a network access behavior of the terminal, that is the terminal may be allowed to access the network via the wireless access point in response to the terminal MAC address being added to the network access white list. The terminal identifier may be used for providing a tracking identity for the network provision server to track the network access behavior of the terminal.

According to a second aspect of embodiments of the present disclosure, a network connection apparatus is provided. The apparatus may include an access point searching module, an information reading module, and an information sending module, among other components.

The access point searching module may search for and select a wireless access point, from among several wireless access points available in the vicinity, to provide network access to a terminal.

The information reading module may read and/or compile terminal information of the terminal. The terminal information may be compiled, or generated, when the access point searching module searches for the wireless access point. Alternatively or in addition, the terminal information may be compiled after the wireless access point is selected. The terminal information may include a terminal identifier and a terminal MAC address of the terminal.

The information sending module may send the terminal information read, or generated, or compiled, by the information reading module to the wireless access point. The wireless access point may forward the terminal information to a network provision server. In response, the network provision server may store the terminal identifier and add the terminal MAC address into a network access white list of the wireless access point. The terminal MAC address in the network access white list may be used for instructing the wireless access point to allow a network access behavior of the terminal. The terminal identifier may be used for providing a tracking identity for the network provision server to track the network access behavior of the terminal.

According to a third aspect of embodiments of the present disclosure, a network connection apparatus is provided. The apparatus may include, among other components, a processor and a memory.

The memory may store instructions executable by the processor.

The processor may perform at least the following operations upon execution of the stored instructions.

For example, the processor may search for and select a wireless access point to provide network access to a terminal. The selected wireless access point may be identified based on preset parameters.

The processor may read, compile, and/or generate terminal information of the terminal when the wireless access point is identified and/or selected. The terminal information may include a terminal identifier and a terminal MAC address of the terminal.

The processor may send the terminal information to the wireless access point. The wireless access point may in turn, forward the terminal information to a network provision server. In response, the network provision server may store the terminal identifier and add the terminal MAC address into a network access white list in the wireless access point. The terminal MAC address in the network access white list may be used for instructing the wireless access point to allow network access by the terminal, and the terminal identifier may be used as a tracking identity by the network provision server to track the network access behavior of the terminal.

According to a fourth aspect of embodiments of the present disclosure, a non-transitory computer-readable storage medium is provided. The non-transitory computer-readable storage medium may have stored therein instructions that, when executed by one or more processors of an apparatus, cause the apparatus to perform at least the following operations.

For example, the instructions may include instructions to search for, and identify and/or select a wireless access point. The wireless access point may be sought to provide network access to a terminal. The terminal may store preset conditions to help identify the wireless access point from among several wireless access points that may be available in the vicinity of the terminal.

The instructions may include instructions to read information of the terminal and compile the terminal information to be sent to the wireless access point. The terminal information may be compiled and sent when the wireless access point is found. The terminal information may include a terminal identifier and a terminal media access control (MAC) address of the terminal.

The instructions may also include instructions to send the terminal information to the wireless access point. The wireless access point may forward the terminal information to a network provision server. The network provision server may store the terminal identifier and add the terminal MAC address into a network access white list of the wireless access point.

The terminal MAC address in the network access white list may be used for instructing the wireless access point to allow a network access behavior of the terminal, and the terminal identifier may be used for providing a tracking identity for the network provision server to track the network access behavior of the terminal.

It shall be appreciated that the above general description and the detailed description hereinafter are only illustrative but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure. The components in the figures are not necessarily to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
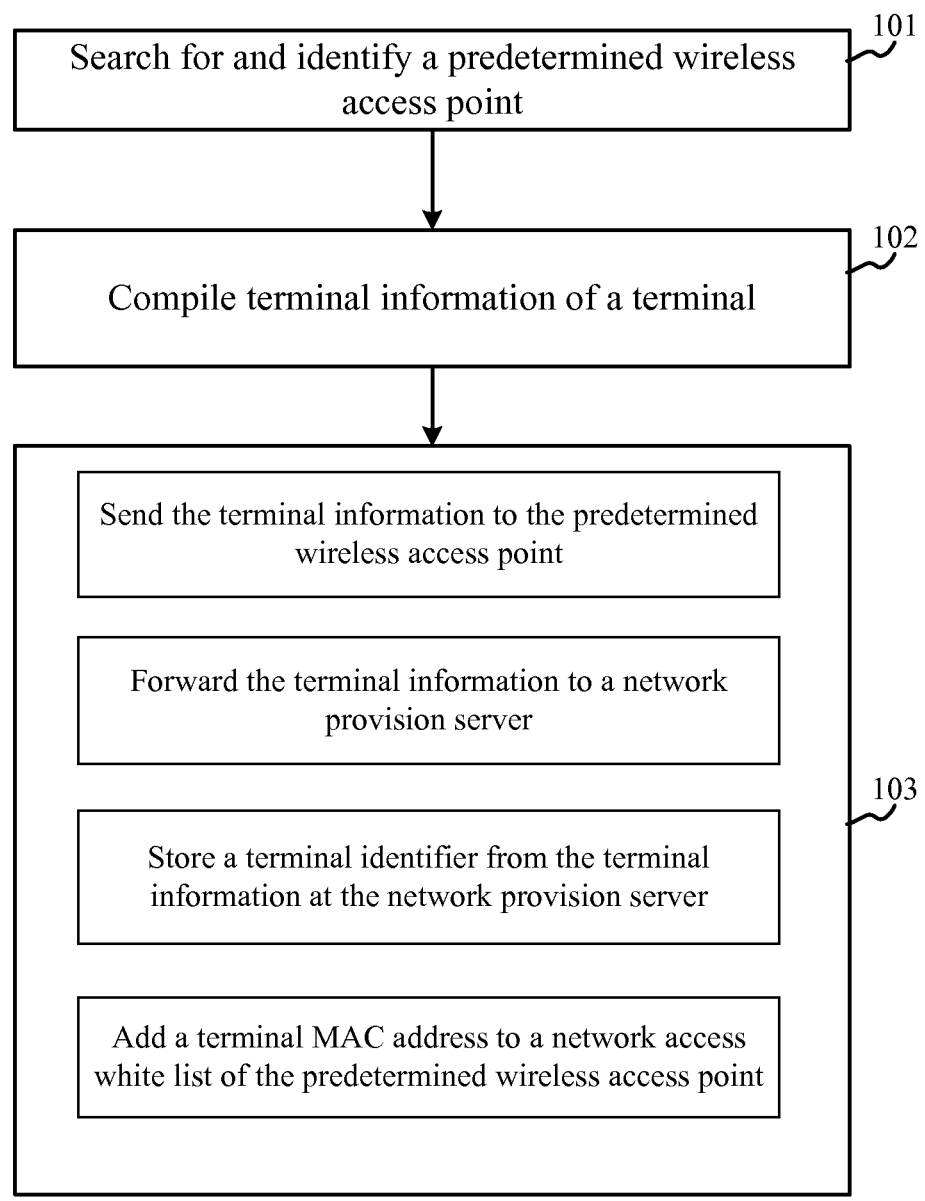
FIG. 1 is a flowchart illustrating a network connection method according to an exemplary embodiment of the present disclosure.

FIG. 1 is a flowchart illustrating a network connection method according to an exemplary embodiment of the present disclosure. The network connection method may be applied in a terminal. As illustrated in FIG. 1, the network connection method may include at least the following steps.

In step 101, a wireless access point may be searched for and identified. The wireless access point may be identified and/or selected based on predetermined parameters, and hence may also be referred to, in some examples, as a predetermined wireless access point.

The predetermined wireless access point may be a wireless access point that is set in advance, and is used for providing wireless network access services for the terminal.

In step 102, terminal information of the terminal may be read and compiled for storage. The compilation may be performed after the wireless access point is identified and/or selected.

The terminal information may include a terminal identifier and a terminal MAC address. The terminal identifier may be information for identifying a user who uses the terminal. For example, the terminal identifier may be a tracking identity that can be tracked, such as a username, a member identifier, an alpha-numeric identifier, an email address, a phone number, a postal address, or any other identifier that may be associated with the user of the terminal. The terminal information complies with the legal provisions that prohibit providing network services for terminals whose tracking identities are not provided. For example, the terminal's MAC address may be information provided to the wireless access point for identification, and determination whether to allow the terminal to access the network.

When searching for the predetermined wireless access point, the terminal, or network connection apparatus, may automatically read the terminal information. Thus the user may not have to manually input the terminal information or any other verification information such as mobile number, username, password, pin or any other type of verification information. This not only reduces the operation complexity, but also improves the information acquisition efficiency.

In step 103, the terminal information may be sent to the wireless access point. The wireless access point may forward the terminal information to a network provision server. The network provision server may store the terminal identifier and add the terminal MAC address into a network access white list of the wireless access point. The terminal MAC address in the network access white list may be used for instructing the wireless access point to enable the terminal to access the network. Thus, a network connection of the terminal may be established, setup, or implemented for the terminal in response to the terminal MAC address being added to the network access white list. The terminal identifier may be used for providing a tracking identity for the network provision server to track the network access of the terminal.

The network provision server may be a server corresponding to the selected wireless access point, and may provide wireless network access services to the terminal.

The network access white list may include terminal MAC addresses of various terminals. The wireless access point may enable network access of the terminals associated with the respective terminal MAC addresses in the network access white list. The network provision server may provide the network access white list to the wireless access point. In an example, the network access white list may be stored in a memory in the wireless access point. Alternatively or in addition, the network access white list may be accessible by the wireless access point; however, the network access white list located at a location remote from the wireless access point.

The terminal may send the terminal information to the wireless access point. The wireless access point may forward the terminal information to the corresponding network provision server. The network provision server may store the terminal identifier included in the terminal information, and add the terminal MAC address into the network access white list. The terminal may then establish a connection to the wireless network, and access the network.

Upon searching out and selecting the wireless access point, the terminal may automatically acquire the terminal information to access the wireless network. Thus, the user may not need to manually input verification information, such as the mobile phone number and/or username, pin, or any other type of verification information to access the wireless network. Therefore, the network connection efficiency may be improved by improving the information acquisition efficiency.

Thus, with the network connection method according to the present disclosure, by searching for a predetermined wireless access point, terminal information of a terminal may be read if the predetermined wireless access point is searched out and/or selected. The terminal information may include a terminal identifier and a terminal MAC address of the terminal. The terminal information may be sent to the predetermined wireless access point. The predetermined wireless access point may forward the terminal information to a network provision server. The network provision server may store the terminal identifier and add the terminal MAC address into a network access white list in the predetermined wireless access point. A network connection for the terminal may thus be established. The terminal MAC address in the network access white list may be used for instructing the predetermined wireless access point to allow network access by the terminal, and the terminal identifier may be used as a tracking identity by the network provision server to track the network access of the terminal. When the predetermined wireless access point is searched out, the terminal information may be automatically read instead of acquiring the terminal information through user inputs. The read terminal information may be sent to the network provision server. The terminal information may provide a user's tracking identity. The network provision server may enable, based on the tracking identity, the terminal to connect to the network. In this way, the technical problem of inefficiencies during connecting a terminal to the network, due to user input of terminal information, such as a mobile phone number or any other verification information via the terminal is solved. As a result, the network connection is established with improved efficiency.

Figure 2:
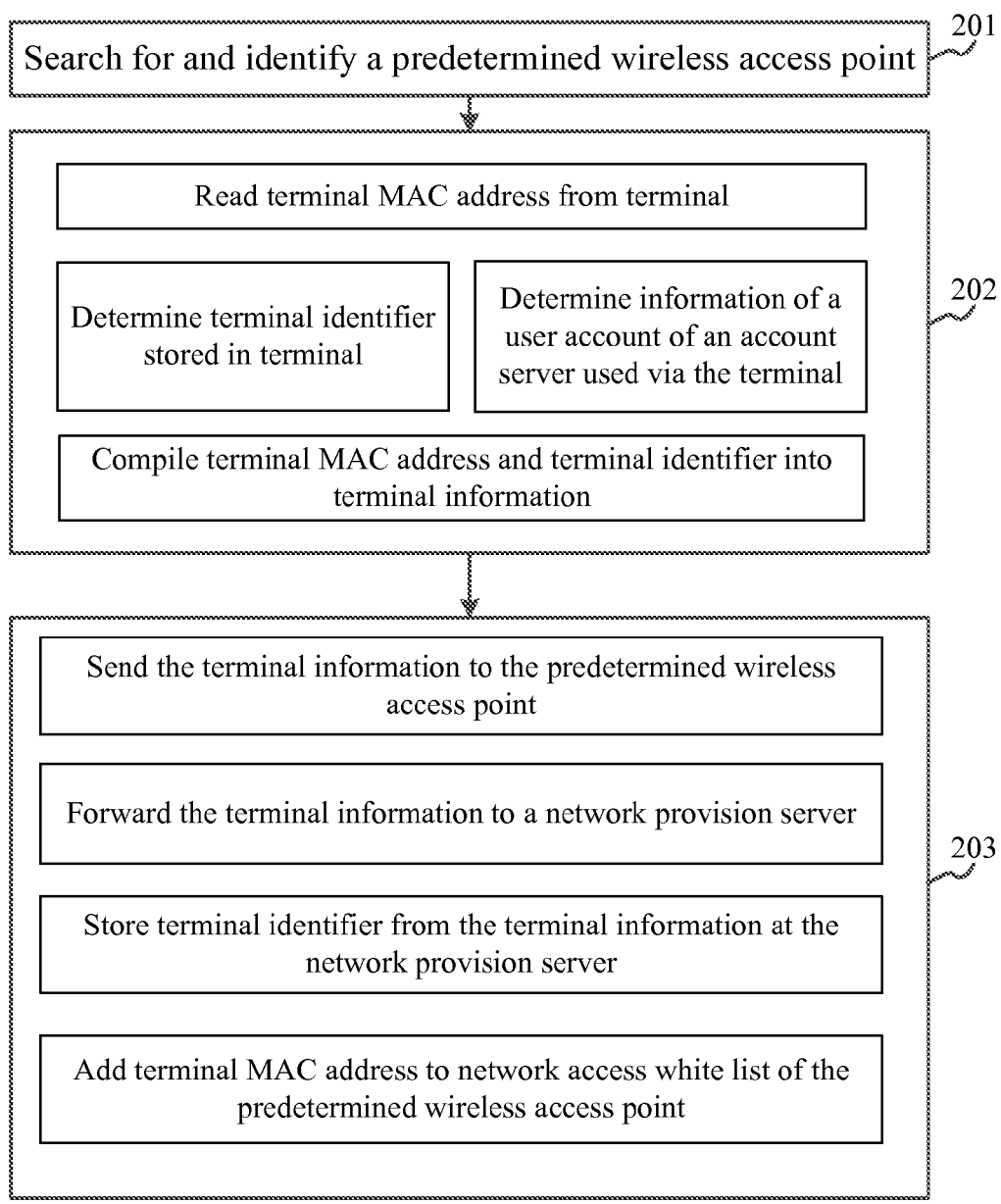
FIG. 2 is a flowchart illustrating a network connection method according to another exemplary embodiment of the present disclosure.

FIG. 2 is a flowchart illustrating a network connection method according to another exemplary embodiment of the present disclosure. The network connection method may be used by a terminal. As illustrated in FIG. 2, the network connection method may include the following steps.

In step 201, the terminal may search for and/or identify a predetermined wireless access point.

The predetermined wireless access point may be a wireless access point that is set in advance. The predetermined wireless access point may provide wireless network access services to the terminal. The predetermined wireless access point may be provided by a third party, for example, provided by a manufacturer of wireless access points.

The wireless access point may periodically broadcast the access point's information. The terminal may find multiple wireless access points in the neighborhood or vicinity of the terminal. The terminal may identify and select the wireless access point from the wireless access points found based on predetermined, or preset, or preconfigured parameters. The terminal may select the wireless access point in various ways. For example, the predetermined parameters used to select the wireless access point from those identified in the neighborhood may include an address segment, a SSID name, and/or a predetermined condition.

In a first example, searching for and identifying the predetermined wireless access point may include:
receiving an access point MAC address broadcast by a wireless access point;
detecting whether the access point MAC address is within a predetermined address segment, or range; and
determining the wireless access point as the predetermined wireless access point when the access point MAC address is within the predetermined address segment, or range.

Each wireless access point has a unique access point MAC address. For differentiation from a common wireless access point, the access point MAC address of the predetermined wireless access point may be set within a predetermined address segment. In this case, the terminal may acquire the predetermined address segment, and select the predetermined wireless access point from the wireless access points according to the predetermined address segment.

When selecting the predetermined wireless access point, the terminal may acquire access point information broadcast by a wireless access point. The terminal may read an access point MAC address of the wireless access point from the access point information, and determine whether the access point MAC address is within the predetermined address segment, or range. If the access point MAC address is within the predetermined address segment, or range, the wireless access point is identified and selected as the predetermined wireless access point. Otherwise, it may be detected that the access point MAC address is not within the predetermined address segment, or range, that is the wireless access point is not the predetermined wireless access point. The next available access point information may be acquired and identified, until successful selection of the predetermined wireless access point. An address segment is a range of addresses.

Since the access point MAC address of a wireless access point is unique, selecting the predetermined wireless access point via the access point MAC address, such as according to above description, achieves a high accuracy.

In a second example, the searching for the predetermined wireless access point may include:
receiving a Service Set Identifier (SSID) name broadcast by a wireless access point;
detecting whether the SSID name satisfies a predetermined condition, wherein the predetermined condition includes at least one of: the SSID name pertains to a predetermined name set, and a naming rule of the SSID name satisfies a predetermined rule; and determining the wireless access point as the predetermined wireless access point if the SSID name satisfies the predetermined condition.

Each wireless access point has an SSID name. The predetermined wireless access point may be distinguished from another wireless access point, for example, on the basis of the SSID name of the predetermined wireless access point. In an example, the SSID name for the predetermined wireless access point may be randomly defined, or selected. The SSID name may be added into a predetermined name set used for storing SSID names of the predetermined wireless access point. The predetermined name set may be available to the terminal to identify the predetermined wireless access point. In another example, the SSID name for the predetermined wireless access point may be defined, or selected, according to a predetermined rule. The terminal may be aware of the predetermined rule. The predetermined wireless access point may be distinguished from another wireless access point based on the SSID name of the predetermined wireless access point.

If the SSID name of the predetermined wireless access point is set randomly, the terminal may pre-acquire the predetermined name set. Accordingly, the terminal may select the predetermined wireless access point from a plurality of wireless access points based on the predetermined name set.

When selecting the predetermined wireless access point, the terminal may acquire access point information broadcast by a wireless access point. The terminal may read an SSID name of the wireless access point from the access point information. The terminal may detect whether the SSID name is included in the predetermined name set. If the SSID name is included in the predetermined name set, the wireless access point is selected as the predetermined wireless access point. Instead, if the SSID name is not one of those in the predetermined name set, the wireless access point is not selected as the predetermined wireless access point. Instead, access point information broadcast by a next wireless access point is acquired and analyzed. The selection process may continue until successful selection of the predetermined wireless access point.

For example, assume that the SSID name of a wireless access point found by the terminal is "City Garden." If the predetermined name set includes "City Garden", "City and Alley", and "Dian Dian", then the terminal may determine that the predetermined name set includes the SSID name of the wireless access point, and select the wireless access point as the predetermined wireless access point.

In an example, the terminal may acquire and update the predetermined name set stored in the terminal at predetermined time intervals to improve the accuracy of selecting the predetermined wireless access point.

If the SSID name of the predetermined wireless access point is set based on a predetermined rule, the terminal may pre-acquire the predetermined rule, and select the predetermined wireless access point from a plurality of wireless access points according to the predetermined rule.

When selecting the predetermined wireless access point, the terminal may acquire access point information broadcast by a wireless access point. The terminal may read an SSID name of the wireless access point from the access point information. The terminal may determine whether the SSID name satisfies the predetermined rule. If the SSID name satisfies the predetermined rule, the wireless access point may be selected as the predetermined wireless access point.

Otherwise, if the SSID name does not satisfy the predetermined rule, the wireless access point is not selected as the predetermined wireless access point, a next wireless access point may be acquired and analyzed until successful selection of the predetermined wireless access point.

For example, consider that the predetermined rule is that the SSID name of the predetermined wireless access point includes the word "Garden." Assume that the SSID name of a wireless access point identified by the terminal is "City Garden." The terminal may determine that the SSID name includes the word "Garden," and thus, satisfies the predetermined rule. Accordingly, the terminal may select the wireless access point as the predetermined wireless access point.

The SSID name of the wireless access point and the predetermined rule may both be modified. Therefore, the terminal may acquire and update the predetermined rule stored in the terminal at predetermined time intervals to improve the accuracy of selecting the predetermined wireless access point.

In step 202, when the predetermined wireless access point is selected, the terminal MAC address recorded in the terminal may be read. The terminal identifier recorded in the terminal may be read, or a user account, which has been logged in to the terminal, may be read. A terminal identifier corresponding to the user account may be acquired. The terminal MAC address and the terminal identifier may be included in, or compiled as the terminal information. In other words, terminal information is generated including the terminal MAC address and the terminal identifier.

That is the terminal information may include the terminal identifier and the terminal MAC address. The terminal identifier may identify a user who uses the terminal. That is, the terminal identifier may provide a tracking identity that may identify the user and usage as of the terminal. The terminal identifier may be used to confirm compliance of the usage with network policy and/or legal provisions that may prohibit particular use of the network. For example, a network policy may prohibit providing network services to a terminal without a tracking identity. The terminal MAC address may be provided to the predetermined wireless access point for identification, and determination whether to enable network access of, or from, or using the terminal.

When finding the predetermined wireless access point, the terminal may read the terminal information, that is the terminal may acquire, or read the terminal MAC address and the terminal identifier recorded in the terminal. Alternatively or in addition, the terminal may read information of a user account, which has been logged in to the terminal, and a terminal identifier corresponding to the user account may be acquired. The terminal MAC address and the terminal identifier may be used as the terminal information. The terminal may automatically read the terminal information, and thus the user may be spared manual input of the terminal information. This not only reduces the operation complexity, but also improves the information acquisition efficiency.

The terminal may first read the terminal MAC address, and then read the terminal identifier; or the terminal may first read the terminal identifier, and then read the terminal MAC address; or the terminal may read the terminal identifier and the terminal MAC address substantially simultaneously. The sequence of reading the terminal MAC address and reading the terminal identifier by the terminal, or the order of compilation of the terminal information does not limit the embodiment in any way.

When reading the terminal MAC address, since the terminal may record its own terminal MAC address, the terminal may read the terminal MAC address directly.

For example, if the terminal is a mobile phone, the terminal identifier may be at least one of an International Mobile Equipment Identity (IMEI) and a mobile phone number. When reading an IMEI, since each terminal may record a terminal MAC address, the terminal may directly read the terminal MAC address. When reading a mobile phone number, if the terminal or subscriber identity module (SIM) card records a mobile phone number, the terminal may directly read the mobile phone number. If neither the terminal nor SIM card records a mobile phone number, the terminal may acquire a user account, and acquire the mobile phone number corresponding to the user account. The user account may be a service provider account, such as a user account with manufacturer of the terminal, such as Mi account, or with a telecommunication, or data service provider associated with the terminal, such as an AT&T account, or the like.

During acquisition of a user account, if a user has logged in to the terminal via the user account, the terminal may automatically read the user account. If the user has not logged in to the terminal via a user account, the terminal may display an interface for the user to provide the user account. The terminal may acquire the user account input in the interface and may acquire the terminal identifier corresponding to the user account.

In an example, the terminal may store correspondence relationships between user accounts and terminal identifiers. In such case, upon determination and/or acquisition of the user account, the terminal may search for the terminal identifier corresponding to the user account using the correspondence relationship. However, if the terminal does not store the correspondence relationships between user accounts and terminal identifiers, the terminal may query the terminal identifier from an account server from which a user account is applied for.

Thus, acquisition of a terminal identifier corresponding to the user account may include at least the following steps.

The terminal may send an access request, for accessing an account server, to the predetermined wireless access point. The access request may contain the user account information. In response, the predetermined wireless access point may determine whether the account server is in the network access white list. The predetermined wireless access point may forward the access request to the account server. The network access white list may include names of various servers which the terminal is allowed to access when the terminal is not networked.

The terminal may receive the terminal identifier from the account server. The terminal identifier may be an identifier that is searched out, or determined, or identified, by the account server and corresponds to the user account.

Since the terminal is in a state where terminal's access to other servers except the network provision server is prohibited, when the terminal sends an access request to a predetermined wireless access point, the predetermined wireless access point may deny the terminal from accessing the network. Therefore, to ensure that the terminal can acquire the terminal identifier, the account server may be added to the network access white list in advance. In another example, the predetermined wireless access point may have a list of account servers that may be accessed by the terminal and that is separate from the network access white list that includes the terminal MAC addresses. The examples described in the present disclosure assume there is a single list, instead of two separate lists, the network access white list and the list of account servers that the terminal may access prior to establishment of a network connection. However, other examples with two separate lists are possible.

When the predetermined wireless access point receives the access request, if the terminal is in the state where terminal's access to other servers except the network provision server is prohibited, the predetermined wireless access point may determine whether the account server receiving the access request is in the network access white list. If the account server is in the network access white list, the predetermined wireless access point may forward the access request to the account server. Upon receiving the access request, the account server may read the user account contained, or included, in the access request. The account server may search for a terminal identifier corresponding to the user account, and may send the terminal identifier to the terminal via the predetermined wireless access point. Thus, the terminal may acquire the terminal identifier.

In step 203, the terminal information may be sent to the predetermined wireless access point. The predetermined wireless access point may forward the terminal information to a network provision server. The network provision server may store the terminal identifier and add the terminal MAC address into a network access white list in the predetermined wireless access point. The terminal may thus establish a network connection. The terminal MAC address in the network access white list may be used for instructing the predetermined wireless access point to allow the terminal to access network, and the terminal identifier may be used as a tracking identity for the network provision server to track the network access of the terminal.

The network provision server may be a server corresponding to the predetermined wireless access point, and may be used for providing wireless network access services to the terminal.

The network access white list may include terminal MAC addresses of various terminals. The wireless access point may allow the terminals whose respective terminal MAC addresses are in the network access white list to access the network. The network access white list may be provided by the network provision server to the predetermined wireless access point. For example, the network provision server may add the terminal MAC address into a network access white list stored in the server, and send the network access white list to the predetermined wireless access point at predetermined time intervals. Alternatively or in addition, the network provision server may add the terminal MAC address into the network access white list stored in the server, and send the network access white list to the predetermined wireless access point upon receiving a name list acquisition request from the predetermined wireless access point.

The terminal may send the terminal information to the predetermined wireless access point. The predetermined wireless access point may forward the terminal information to the corresponding network provision server. The network provision server may store the terminal identifier included in the terminal information, and then add the terminal MAC address into the network access white list. The terminal thus, may establish access to the wireless network.

When a terminal accesses the network via a pre-assigned Internet Protocol (IP) address, the terminal may send a webpage access request to a predetermined wireless access point. Upon detecting that the network access white list includes the terminal MAC address of the terminal, the predetermined wireless access point may allow the terminal to access the network. The predetermined wireless access point allows access to the network by the terminal, by forwarding the webpage access request to a corresponding webpage server, such that the webpage server may send webpage content requested by the webpage access request to the terminal. During the process of accessing the network by the terminal via an IP address, the network provision server may track each network access of the terminal according to a tracking identity provided by the terminal identifier. If, the terminal MAC address of the terminal is not in the network access white list, the predetermined wireless access point may not forward the webpage access request to the corresponding webpage server. The network access may include network requests, other than webpage requests, such requests to email server, instant messenger servers, game servers, video providing servers, audio providing servers, or any other network service request.

Upon identifying and selecting the predetermined wireless access point, the terminal may automatically acquire the terminal information to access the wireless network Thus the user may not input mobile phone number and/or verification information to access the wireless network. Therefore, the network connection may be established efficiently than stopping for user input for such information.

With the network connection method according to the present disclosure, by searching for a predetermined wireless access point, terminal information of a terminal may be read if the predetermined wireless access point is searched out. The terminal information may include a terminal identifier and a terminal MAC address of the terminal. The terminal information may be sent to the predetermined wireless access point. The predetermined wireless access point may forward the terminal information to a network provision server. The network provision server may store the terminal identifier and add the terminal MAC address into a network access white list in the predetermined wireless access point. The terminal may subsequently be allowed to make network requests. The terminal MAC address in the network access white list may be used for instructing the predetermined wireless access point to allow a network access of the terminal. The terminal identifier may be used for providing a tracking identity for the network provision server to track the network access of the terminal. When the predetermined wireless access point is searched, the terminal information may be automatically read instead of acquiring the terminal information via user inputs. The read terminal information may be sent to the network provision server. The user's tracking identity may be identified via the terminal information. The network provision server may allow the terminal to connect to the network based on the tracking identity. In this way, the technical problem of establishing a network connection at a terminal, particularly inefficiency resulting from inputting a mobile phone number and verification information in the terminal, is solved, and an the network connection is established in an improved and efficient manner.

In addition, an access request for accessing an account server may be sent to the predetermined wireless access point. The access request may contain user account information. Upon determining that the account server is in the network access white list, the predetermined wireless access point may forward the access request to the account server. The network access white list may include names, or identifiers, of servers which the terminal is allowed to access when the terminal is not networked, that is disallowed to access the network. The predetermined wireless access point may receive a terminal identifier from the account server, wherein the terminal identifier may be an identifier that is identified by the account server based on the user account information. In this way, the technical problem during establishment of a network connection of a terminal, particularly regarding inefficiencies resulting due to failure to acquire the terminal identifier by the terminal, and instead being acquired by inputting a mobile phone number and/or verification information in the terminal is solved. As an effect the network connection is established efficiently.

Figure 3:
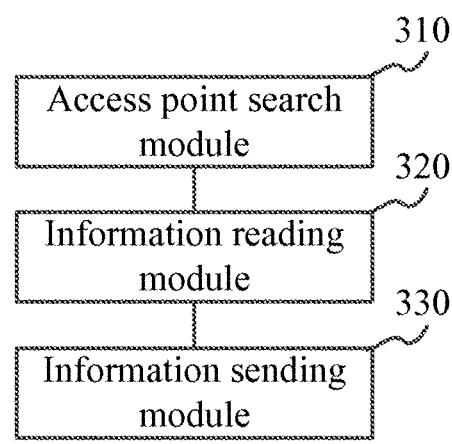
FIG. 3 is a block diagram illustrating a network connection apparatus according to an exemplary embodiment of the present disclosure.

FIG. 3 is a block diagram illustrating a network connection apparatus according to an exemplary embodiment of the present disclosure. The network connection apparatus may be at a terminal, or a part of the terminal. The terminal may be a communication apparatus such as a mobile phone, a smart phone, a personal digital assistant, a camera, a media player (such as iPod, Walkman, or any other), a tablet computer, a laptop, or any other communication apparatus. In an example, the network connection apparatus may be a communication apparatus, such as one of those listed above. As illustrated in FIG. 3, the network connection apparatus may include an access point searching module 310, an information reading module 320, and an information sending module 330. The network connection apparatus 100 may include more, fewer, or different modules, elements, or components.

The access point searching module 310 may search for a predetermined wireless access point.

The information reading module 320 may read terminal information of a terminal when the access point searching module 310 searches out the predetermined wireless access point. The terminal information may include a terminal identifier and a terminal MAC address of the terminal.

The information sending module 330 may send the terminal information read by the information reading module 320 to the predetermined wireless access point. The predetermined wireless access point may forward the terminal information to a network provision server. The network provision server may store the terminal identifier and add the terminal MAC address into a network access white list of the predetermined wireless access point. The network access white list may be stored on a memory of the predetermined wireless access point. Alternatively or in addition, the network access white list may be at a location remote from the predetermined wireless access point, but accessible by both, the predetermined wireless access point and the network provision server. Once the terminal information is accessible by the predetermined wireless access point, a network connection of the terminal may be established. The terminal MAC address in the network access white list may be used for instructing the predetermined wireless access point to allow the terminal to access the network. The terminal identifier in the terminal information may be used for providing a tracking identity for the network provision server to track the network access of the terminal.

With the network connection apparatus according to the present disclosure, by searching for a predetermined wireless access point, terminal information of a terminal may be read if the predetermined wireless access point is searched out. The terminal information may include a terminal identifier and a terminal MAC address of the terminal. The terminal information may be sent to the predetermined wireless access point. The predetermined wireless access point may forward the terminal information to a network provision server whereupon the network provision server may store the terminal identifier and add the terminal MAC address into a network access white list. The predetermined wireless access point may access the network access white list and implement a network connection for the terminal. The predetermined wireless access point may use the terminal MAC address in the network access white list to allow a network access by the terminal. The network provision server may use the terminal identifier in the terminal information as a tracking identity to track the network access of the terminal. When the predetermined wireless access point is identified, the terminal information may be automatically read instead of acquiring the terminal information via user inputs. The read terminal information may be sent to the network provision server. A tracking identity of a user of the terminal may be identified based on the terminal information. For example, the network provision server may use the terminal identifier as a tracking identity. The network provision server may allow the terminal to connect to the network based on the tracking identity. In this way, inefficiencies during connecting a terminal to the network, such as due to manually inputting a mobile phone number and/or verification information via the terminal are avoided, and as a result, the network connection is established efficiently.

Figure 4:
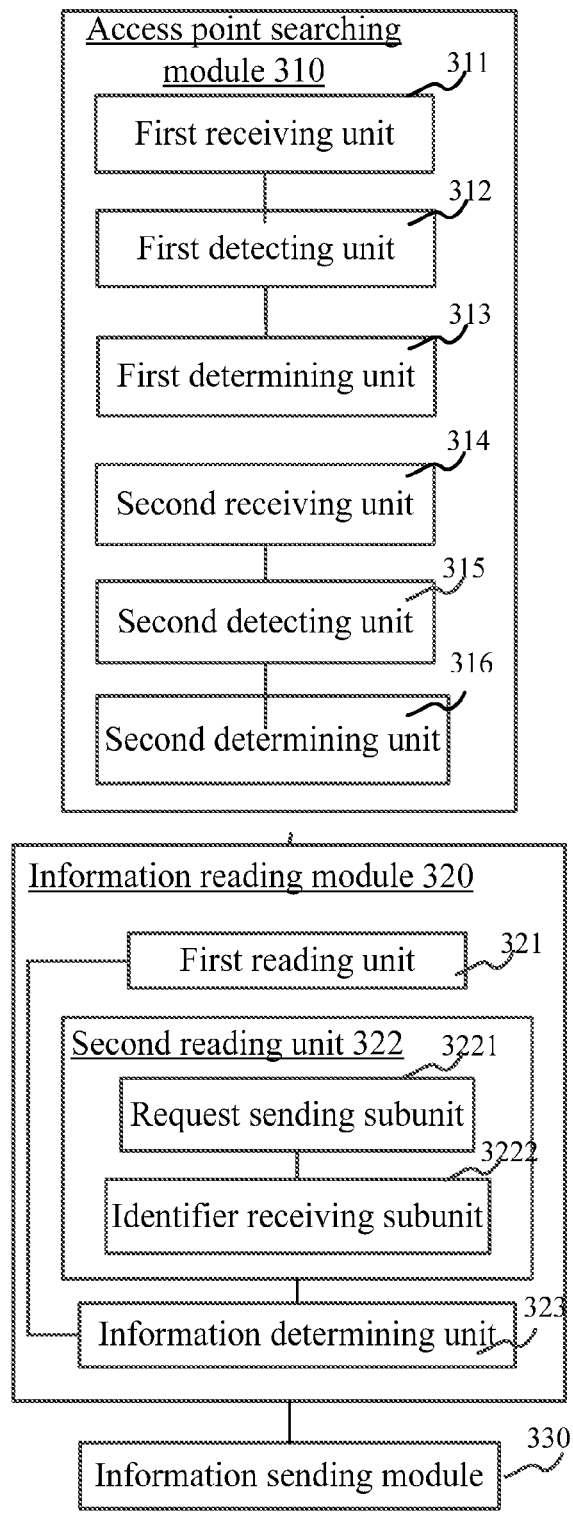
FIG. 4 is a block diagram illustrating a network connection apparatus according to another exemplary embodiment of the present disclosure.

FIG. 4 is a block diagram illustrating a network connection apparatus according to an exemplary embodiment of the present disclosure. The network connection apparatus may be part of a terminal.

The information reading module 320 may include a first reading unit 321, a second reading unit 322, and an information determining unit 323. The information reading module 320 may include more, fewer, or different units, elements, or components.

The first reading unit 321 may read the terminal MAC address recorded in the terminal.

The second reading unit 322 may read the terminal identifier recorded in the terminal. Alternatively or in addition, the second reading unit 322 may read a user account, which may be used to login to the terminal. The second reading unit 322 may acquire a terminal identifier corresponding to the user account.

The information determining unit 323 may compile the terminal MAC address read by the first reading unit 321 and the terminal identifier read by the second reading unit 322 as the terminal information.

The second reading unit 322 may include a request sending subunit 3221 and an identifier receiving subunit 3222. The second reading unit 322 may include more, fewer, or different subunits, elements, or components.

The request sending subunit 3221 may send an access request, for accessing an account server, to the predetermined wireless access point. The access request may contain, or include, or carry, the user account information. The user account information may include verification information, such as a user name, a password, a pin, or any other verification information. The user account information may be encrypted. The wireless access point may determine that the account server is in the network access white list, upon receiving the access request. The predetermined wireless access point may make the determination based on a MAC address, a server name, or any other unique identifier of the account server, being in the network access white list of the predetermined wireless access point. Once the account server is determined to be in the network access white list, the predetermined wireless access point may forward the access request to the account server. The network access white list may include names of servers that the terminal is allowed to access when the terminal is not networked.

The identifier receiving subunit 3222 may receive a terminal identifier from the account server. The terminal identifier may be an identifier that identified by the account server corresponding to the user account.

The access point searching module 310 may include a first receiving unit 311, a first detecting unit 312, and a first determining unit 313. The access point searching module 310 may include more, fewer, or different subunits, elements, or components.

The first receiving unit 311 may receive an access point MAC address broadcast by a wireless access point.

The first detecting unit 312 may detect whether the access point MAC address received by the first receiving unit 311 is within a predetermined address segment.

The first determining unit 313 may select the wireless access point as the predetermined wireless access point when the first detecting unit 312 detects that the access point MAC address is within the predetermined address segment.

In another example, the access point searching module 310 may include a second receiving unit 314, a second detecting unit 315, and a second determining unit 316.

The second receiving unit 314 may receive an SSID name broadcast by a wireless access point.

The second detecting unit 315 may detect whether the SSID name received by the second receiving unit 314 satisfies a predetermined condition. For example, the predetermined condition may include at least one of: the SSID name pertains to a predetermined name set, and a naming rule of the SSID name satisfies a predetermined rule.

The second determining unit 316 may determine the wireless access point as the predetermined wireless access point if the second detecting unit 315 detects that the SSID name satisfies the predetermined condition.

Thus, the network connection apparatus according to the present disclosure, during or upon searching for a predetermined wireless access point, may automatically read terminal information of the terminal requesting network access. The terminal information may include a terminal identifier and a terminal MAC address of the terminal. The network connection apparatus may send the terminal information to the predetermined wireless access point. The predetermined wireless access point may forward the terminal information to a network provision server. The network provision server may store the terminal identifier and add the terminal MAC address into a network access white list accessible by the predetermined wireless access point. The predetermined wireless access point may, in response, establish a network connection for the terminal. The predetermined wireless access point may use the terminal MAC address added to the network access white list to allow a network access of the terminal. The network provision server may use the terminal identifier as a tracking identity to track the network access behavior of the terminal. When the predetermined wireless access point is identified, the network connection apparatus may automatically read the terminal information, instead of acquiring the terminal information via user inputs. The read terminal information may be sent to the network provision server. The terminal information may provide tracking identity of a user logged in via the terminal. The network provision server may allow the terminal to connect to the network based on the tracking identity. In this way, inefficiencies during establishment of a network connection at a terminal, which may be caused by manual input of a mobile phone number and/or verification information at the terminal is avoided. As a result, the network connection is established automatically, without user intervention, and more efficiently.

Alternatively or in addition, the network connection apparatus may send an access request for accessing an account server to the predetermined wireless access point. The access request may contain a user account information. The user account information may be encrypted. The user account information may contain information pertaining to the user account, such as a username, a password, a date, a password hint, a name, an address, or other information that may be used to identify and/or verify a user account. The account server may authenticate the user account. The predetermined wireless access point, upon receiving the access request, may determine whether the account server is in the network access white list. If the account server is in the network access white list, the predetermined wireless access point may forward the access request to the account server. The network access white list may include identities, such as names, MAC addresses, or the like, of servers which the terminal is allowed to access when the terminal is not networked. In response to forwarding the access request to the account server, the predetermined wireless access point may receive a terminal identifier from the account server. The terminal identifier may be an identifier that corresponding to the user account at the account server. The predetermined wireless access point, thus receives the terminal information, including the terminal identifier and the terminal MAC address, automatically, and without user intervention. Further, in the case of failure to acquire the terminal identifier from the terminal itself, the predetermined wireless access point may receive the terminal identifier from an account server, without any user input. This improves efficiency in establishing the network connection for the terminal as it avoids manually inputting a mobile phone number and/or verification information at the terminal.

With respect to the apparatuses in the above embodiments, the specific implementations of operations executed by various modules thereof have been described in detail in the embodiments illustrating the methods, which are not described herein any further.

The apparatus 300 may be implemented in many different ways. Each module, component, element, unit, and subunit, such as the access point searching module 310, the information reading module 320, and the information sending module 330, and their respective units and subunits described throughout this document, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of a memory, for example, that comprises instructions executable with a processor to implement one or more of the features of the module. When any one of the module includes the portion of the memory that comprises instructions executable with the processor, the module may or may not include the processor. In some examples, each module may just be the portion of a physical memory that comprises instructions executable with one or more processors to implement the features of the corresponding module without the module including any other hardware. Because each module includes at least some hardware even when the included hardware comprises software, each component may be interchangeably referred to as a hardware module, such as the access point searching hardware, the information reading hardware, and the information sending hardware.

Figure 5:
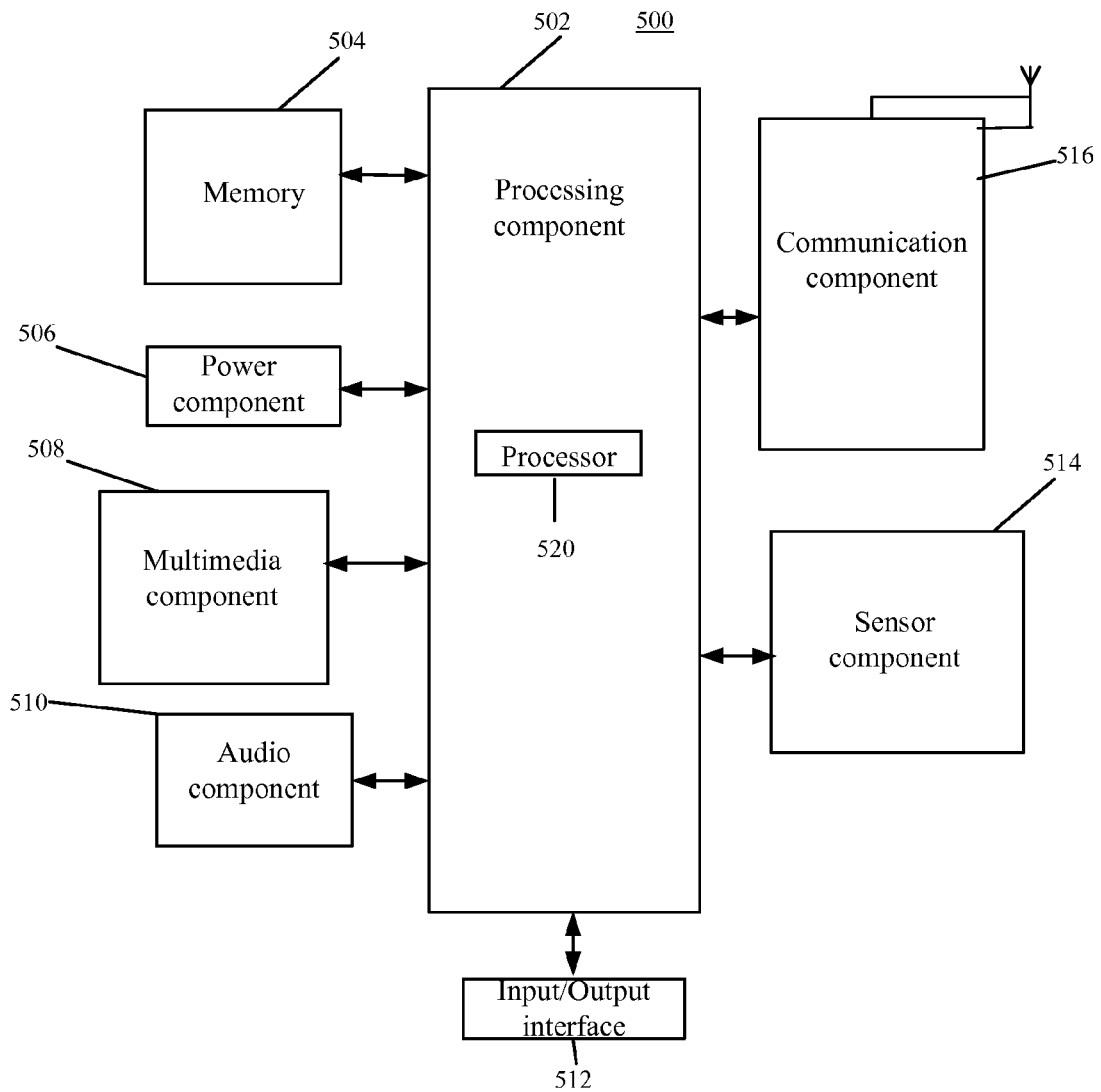
FIG. 5 is a block diagram illustrating an apparatus for use in network connection according to an exemplary embodiment of the present disclosure.

FIG. 5 is a block diagram illustrating an apparatus 500 for use in network connection according to an exemplary embodiment of the present disclosure. For example, the apparatus 500 may be a mobile phone, a computer, a digital broadcast terminal, a messaging device, a gaming console, a tablet, a medical device, exercise equipment, a personal digital assistant, and the like.

Referring to FIG. 5, the apparatus 500 may include one or more of the following components: a processing component 502, a memory 504, a power component 506, a multimedia component 508, an audio component 510, an input/output (I/O) interface 512, a sensor component 514, and a communication component 516.

The processing component 502 may control overall operations of the apparatus 500, such as the operations associated with display, telephone calls, data communications, camera operations, and recording operations. The processing component 502 may include one or more processors 518 to execute instructions to perform all or a part of the steps in the above-described methods. In addition, the processing component 502 may include one or more modules which facilitate the interaction between the processing component 502 and other components. For example, the processing component 502 may include a multimedia module to facilitate the interaction between the multimedia component 508 and the processing component 502.

The memory 504 may store various types of data to support the operations of the apparatus 500. Examples of such data include instructions for any application or method operated on the apparatus 500, contact data, phonebook data, messages, pictures, videos, and the like. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 may provide power to various components of the apparatus 500. The power component 506 may include a power management system, one or more power supplies, and other components associated with the generation, management, and distribution of power in the apparatus 500.

The multimedia component 508 includes a screen providing an output interface between the apparatus 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and/or the rear camera may receive external multimedia data while the apparatus 500 is in an operation mode, such as a photographing mode or a video mode. Each of the front camera and the rear camera may be a fixed optical lens system or have focus and optical zoom capability.

The audio component 510 may output and/or input audio signals. For example, the audio component 510 may include a microphone (MIC) configured to receive an external audio signal when the apparatus 500 is in an operation mode, such as a call mode, a recording mode, or a voice recognition mode. The received audio signal may be stored in the memory 504 or transmitted via the communication component 516. In some embodiments, the audio component 510 further includes a speaker to output audio signals.

The I/O interface 512 provides an interface between the processing component 502 and a peripheral interface module, such as a keyboard, a click wheel, buttons, or the like. The buttons may include, but are not limited to, a home button, a volume button, a starting button, and a locking button.

The sensor component 514 includes one or more sensors to provide status assessments of various aspects of the apparatus 500. For example, the sensor component 514 may detect an open/closed status of the apparatus 500, relative positioning of components, e.g., the display and the keypad, of the apparatus 500, a change in position of the apparatus 500 or a component of the apparatus 500, a presence or absence of user contact with the apparatus 500, an orientation or an acceleration/deceleration of the apparatus 500, and a change in temperature of the apparatus 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 may enable communications, wired or wirelessly, between the apparatus 500 and other devices. The apparatus 500 may access a wireless network based on a communication standard, such as WiFi, 2G, or 3G, or any other technique or a combination thereof. For example, the communication component 516 may receive a broadcast signal or broadcast associated information from an external broadcast management system via a broadcast channel. In another example, the communication component 516 may include a near field communication (NFC) module to facilitate short-range communications. For example, the NFC module may use radio frequency identification (RFID) technology, an infrared data association (IrDA) technology, an ultra-wideband (UWB) technology, a Bluetooth (BT) technology, and other technologies.

In exemplary embodiments, the apparatus 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods. For example, the processing component 502 may be a central processor of the apparatus 500 responsible for execution of an operating system, control instructions, and applications installed on the apparatus 500. The processing component 502 may be one or more devices operable to execute logic. The logic may include computer executable instructions or computer code embodied in the memory 504 or in other memory that when executed by the processing component 502, cause the processing component 502 to perform the features implemented by the logic. The computer code may include instructions executable with the processing component 502. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The processing component 502 may be a general processor, central processing unit, server, ASIC, digital signal processor, FPGA, digital circuit, analog circuit, or combinations thereof. The processing component 502 may be in communication with the memory 504 and the other components of the apparatus 500.

In exemplary embodiments, there is also provided a non-transitory computer-readable storage medium including instructions, such as included in the memory 504, executable by the processor 518 in the apparatus 500, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

As used throughout the present document, a second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Other embodiments of the present disclosure will be apparent to those skilled in the art from consideration of the specification and practice of disclosure herein. This application is intended to cover any variations, uses, or adaptations of the present disclosure following the general principles thereof and including such departures from the present disclosure as coming within common knowledge or customary technical means in the art. It is intended that the specification and examples be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A network connection method, comprising:
 receiving, by a network connection apparatus of a terminal, an access point media access control (MAC) address broadcast by a wireless access point among one or more wireless access points;
 determining, by the network connection apparatus, whether the access point MAC address is within a predetermined address segment; and selecting, by the network connection apparatus, the wireless access point as the selected wireless access point in response to a corresponding access point MAC address being within the predetermined address segment;

acquiring, by the network connection apparatus, terminal information of the terminal requesting network access via the selected wireless access point, the terminal information comprising a terminal identifier and a terminal MAC address of the terminal; and sending, by the network connection apparatus, the terminal information to the selected wireless access point for the selected wireless access point to forward the terminal information to a network provision server for storage of the terminal identifier and addition of the terminal MAC address into a network access white list of the selected wireless access point, wherein the selected wireless access point enables network access by the terminal in response to the terminal MAC address being in the network access white list, and the terminal identifier is associated with a user of the terminal and provides a tracking identity for the network provision server to track network access of the terminal and the user when connected to the selected wireless access point.

2. The method according to claim 1, wherein acquiring the terminal information of the terminal comprises:
   determining the terminal MAC address recorded in the terminal;
   determining the terminal identifier recorded in the terminal; and
   compiling the terminal MAC address and the terminal identifier as the terminal information.

3. The method according to claim 1, wherein acquiring the terminal information of the terminal comprises:
   determining the terminal MAC address recorded in the terminal;
   determining user account information of a user account used to login to the terminal and acquiring the terminal identifier corresponding to the user account; and
   compiling the terminal MAC address and the terminal identifier as the terminal information.

4. The method according to claim 3, wherein acquiring the terminal identifier corresponding to the user account comprises:
   sending, by the network connection apparatus, an access request for accessing an account server to the selected wireless access point, the access request comprising the user account information to be forwarded by the selected wireless access point to the account server upon determination that the account server is in the network access white list, wherein the network access white list comprises identities of servers, which the terminal is allowed to access prior to establishing a network connection; and
   receiving, by the selected wireless access point, the terminal identifier from the account server, the terminal identifier being identified by the account server corresponding to the user account.

5. The method according to claim 1, wherein identifying the selected wireless access point comprises:
   receiving, by the network connection apparatus, a respective service set identifier (SSID) name broadcast by the one or more wireless access points;
   detecting, by the network connection apparatus, whether the SSID name satisfies a predetermined condition; and
   selecting, by the network connection apparatus, a wireless access point as the selected wireless access point in response to the corresponding SSID name satisfying the predetermined condition.

6. The method according to claim 5, wherein the predetermined condition comprises at least one of: the SSID name being included in a predetermined set of SSID names, and a predetermined SSID naming rule.

7. An apparatus comprising a network connection apparatus, the network connection apparatus comprising:
   a processor;
   a memory for storing instructions executable by the processor;
   wherein the processor is configured to:
   receive an access point media access control (MAC) address broadcast by a wireless access point among one or more wireless access points;
   determine whether the access point MAC address is within a predetermined address segment;
   select the wireless access point to provide network access to the terminal in response to the access point MAC address being within the predetermined address segment;
   generate terminal information of the terminal, the terminal information comprising a terminal identifier and a terminal MAC address of the terminal; and
   send the terminal information to the selected wireless access point for the selected wireless access point to forward to a network provision server for storage of the terminal identifier and addition of the terminal MAC address into a network access white list of the selected wireless access point; and
   wherein the selected wireless access point enables network access for the terminal in response to the terminal MAC address being added in the network access white list and the terminal identifier is associated with a user of the terminal for tracking usage as of the terminal.

8. The apparatus according to claim 7, wherein the terminal identifier provides a tracking identity for the network provision server to track the network access of the terminal.

9. The apparatus according to claim 7, wherein the processor is further configured to:
   determine the terminal MAC address recorded in the terminal;
   determine the terminal identifier recorded in the terminal; and
   compile the terminal MAC address and the terminal identifier as the terminal information.

10. The apparatus according to claim 9, wherein the processor is further configured to:
    determine a user account used to login to the terminal and acquire the terminal identifier corresponding to the user account.

11. The apparatus according to claim 10, wherein the processor is further configured to:
    send an access request for accessing an account server to the selected wireless access point, for the selected wireless access point to forward to the account server upon determination, by the selected wireless access point, that the terminal is allowed to access the account server prior to being networked, wherein the access request contains information about the user account; and in response, receive the terminal identifier from the account server, the terminal identifier being an identifier identified by the account server corresponding to the information about the user account.

12. The apparatus according to claim 7, wherein the processor is further configured to:

receive a service set identifier (SSID) name broadcast by the wireless access point among the one or more wireless access points;

determine whether the SSID name satisfies a predetermined condition, the predetermined condition comprising at least one of: the SSID name being in a predetermined name set, and a predetermined naming rule of the SSID name; and select the wireless access point in response to the SSID name satisfying the predetermined condition.

13. A non-transitory computer-readable storage medium having stored instructions that are executable by a processor of a network connection apparatus in a terminal, causes the network connection apparatus to perform a network connection method, the method comprising:

selecting a wireless access point from among one or more wireless access points;

generating terminal information of the terminal seeking network access via the selected wireless access point, the terminal information comprising a terminal identifier and a terminal media access control (MAC) address of the terminal; and sending the terminal information to the selected wireless access point, to forward the terminal information to a network provision server, wherein the network provision server stores the terminal identifier and adds the terminal MAC address into a network access white list of the selected wireless access point, and identifying an account server on the network access white list of the selected wireless access point as accessible by the terminal prior to establishment of a network connection, wherein the selected wireless access point provides network access to the terminal based on the terminal MAC address being in the network access white list and the terminal identifier is associated with a user of the terminal for tracking usage as of the terminal.

14. The non-transitory computer-readable storage medium of claim 13, the method further comprises:

determining the terminal identifier recorded in the terminal.

15. The non-transitory computer-readable storage medium of claim 13, the method further comprising:

determining information associated with a user account used to login to an account server via the terminal;

sending an access request for to the account server via the selected wireless access point, the access request comprising the information associated with the user account; and receiving, in response to the access request, the terminal identifier from the account server, wherein the terminal identifier is identified by the account server based on the information associated with the user account.

16. The non-transitory computer-readable storage medium of claim 13, the method further comprising:

selecting a wireless access point based on a MAC address of the selected wireless access point being within a predetermined range.

17. The non-transitory computer-readable storage medium of claim 16, the method further comprising:

selecting a wireless access point based on a predetermined condition being satisfied by a service set identifier (SSID) name associated with the selected wireless access point.

\* \* \* \* \*